No. 791,964. PATENTED JUNE 6, 1905.
H. WELLER & J. B. HOWE.
MANURE SEPARATOR.
APPLICATION FILED OCT. 1, 1904.
2 SHEETS—SHEET 1.
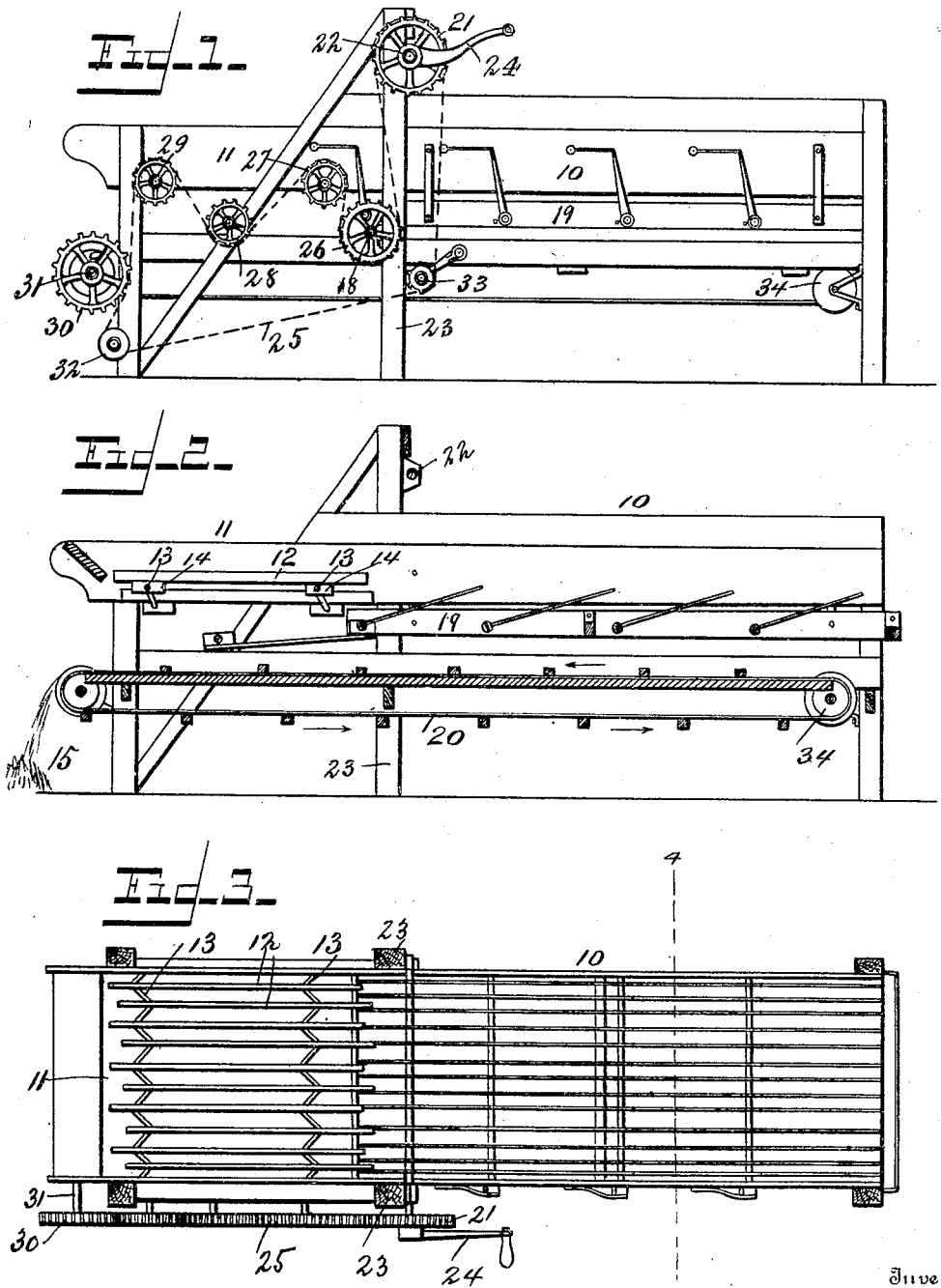
Witnesses:
W. H. Durand.
Arthur W. Crossley
Inventors
Harry Weller and
James B. Howe,
By Lans Bagger & Co
Attorneys.

No. 791,964. PATENTED JUNE 6, 1905.
H. WELLER & J. B. HOWE.
MANURE SEPARATOR.
APPLICATION FILED OCT. 1, 1904.
2 SHEETS—SHEET 2.
Fig. 4.
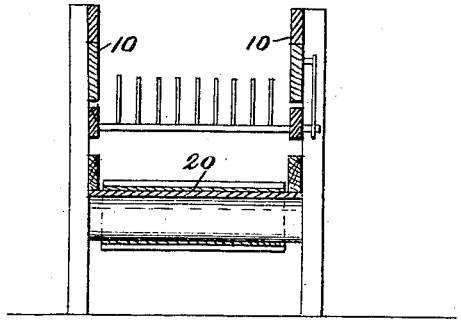
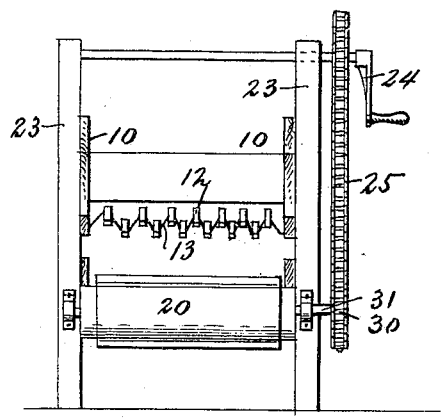
Fig. 5.
Witnesses:
W. H. Durand.
Arthur W. Crossley
Inventors.
Harry Weller and
James B. Howe,
By Lewis Bagger & Co.
Attorneys.

No. 791,964.

Patented June 6, 1905.

UNITED STATES PATENT OFFICE.

HARRY WELLER AND JAMES B. HOWE, OF MARSHALL, MICHIGAN.

MANURE-SEPARATOR.

SPECIFICATION forming part of Letters Patent No. 791,964, dated June 6, 1905.

Application filed October 1, 1904. Serial No. 226,860.

*To all whom it may concern:*

Be it known that we, HARRY WELLER and JAMES B. HOWE, citizens of the United States, residing at Marshall, in the county of Calhoun and State of Michigan, have invented new and useful Improvements in Manure-Separators, of which the following is a specification.

It is the object of this invention to separate stable-manure from straw that has been used in the stable and not yet "worked" into manure, with the double purpose of drying the straw to such an extent that it may be reused as bedding and working it up into manure ready to be hauled into the field.

The invention will clearly appear from the full description hereinafter given in connection with the annexed drawings, forming part of this specification, of which—

Figure 1 is a side elevation of the machine complete. Fig. 2 is a vertical longitudinal sectional view of the same. Fig. 3 is a plan view of the same. Fig. 4 is a transverse sectional view taken on the line 4 4 of Fig. 3. Fig. 5 is a front view.

The same symbols of reference designate the same parts or features, as the case may be, wherever they occur.

In the drawings, 10 designates the frame of the machine, which may be of wood or iron or partly of wood and partly of iron, as circumstances may suggest or require. Moreover, the height and other dimensions of the machine may be suited to circumstances.

A hopper-like part 11 is formed at what may be termed the "rear" end of the machine, which has a gridded bottom formed from a series of slats 12, arranged edgewise on a pair of double crank-shafts 13, which imparts to the said slats a walking motion, thoroughly shaking the gridded bottom of the hopper and causing the manure to fall through on an apron 20, traveling in the direction indicated by the arrows, depositing the manure on a pile 15 at the rear end of the machine. The tendency of the walking motion of the slats forming the bottom of the hopper is to move the straw forward upon a shaker or rack 19, movably supported in position to receive the straw from the bottom of the hopper. The said shaker comprises a series of slats and vibratory lifting-fingers pivoted between the slats, which are operated with a tendency to shake the finer foreign matters from the straw and move the latter forward on the shaker. Under the forward part of the hopper there are slats 16, supported at their rear ends on the cross-rod 18, which slats incline upward to the slats 40, forming the bottom of the shaker 41. From the hopper 11 the straw will be worked forward by the oscillating rack 19 to the front end of the machine, where it will fall upon the floor in a quite clean condition. The fine manure worked out of the straw on its passage forward by the shaker and fingers operating with it will fall through the slats forming the support for the straw and fall upon the horizontal apron 20, by which it will be carried rearwardly and be disposed of in the same way as the other manure spoken of.

Movement will be imparted to the operative parts of the machine from the driving-wheel 21 on a rod, or it may be a stub-shaft 22, which shaft may be supported in suitable bearings on an upright 23 and be provided with a crank 24. The drive-wheel 21 may be a sprocket-wheel and drive a sprocket-chain 25, which passes about a sprocket-wheel 26 on the forward shaft 18, thence up over a sprocket-wheel 27 on the forward shaft 13, thence down and partially around the wheel 28 on the rearward shaft 18, thence up over a wheel 29 on the rearward shaft 13, thence down and in contact with the wheel 30 on the shaft 31, by which the apron 20 is driven, and thence around idle pulleys or wheels 32 and 33 to the point of starting.

Other means for operating the machine may be provided; but what we have described will be found simple and efficient.

The roller 34 at the forward end of the machine about which the endless belt passes will be driven by the belt itself, as will be readily understood.

As seen in Fig. 3, the whole upper part of the machine above the apron will be open and formed as a grid, so that the manure may at any point fall through upon the apron, which carries it back on the pile 15, while the straw will be carried forward in practically cleaned condition, so that it may be spread out and dried, if not already in that condition, and used again as bedding or in any other way to work it up into manure.

It is obvious that the machine can be manufactured at low cost and that all the stable-straw of a barn of quite large size can be treated in a very short time daily.

The apron will be provided on its upper or out side with cross-slats to be more effectual in carrying away the manure deposited on it.

While we term this machine one for separating stable-straw, it will be understood as designed for separating manure from any straw or fodder-stalks in order to assist in working the straw and stalks into manure by using it for bedding or tramping it by cattle into manure in the barn-yard and straw-shed.

What we claim is—

The combination of a frame formed at one end as a receiving-hopper, a bottom for separating and loosening the straw &c., and feeding it forward, comprising a pair of correspondingly double-cranked shafts, and slats mounted on and receiving walking motion from said shafts, a shaker movably supported in position to receive the straw from said bottom, comprising slats and vibratory lifting-fingers pivoted between the slats; means for reciprocating the shaker and vibrating the fingers, and a horizontal traveling apron extending beneath said bottom and shaker to receive the finer matters and deliver them at the end opposite to the straw-discharge.

In testimony whereof we affix our signatures in presence of two subscribing witnesses.

HARRY WELLER.
JAMES B. HOWE.

Witnesses:
  CRAIG C. MILLER,
  HERBERT E. WINSOR.